(12) United States Patent
Chen

(10) Patent No.: US 11,210,633 B2
(45) Date of Patent: Dec. 28, 2021

(54) COLLABORATIVE EVENT PROCESSING METHOD AND APPARATUS

(71) Applicant: DINGTALK HOLDING (CAYMAN) LIMITED, Grand Cayman (KY)

(72) Inventor: Hang Chen, Zhejiang (CN)

(73) Assignee: Dingtalk Holding (Cayman) Limited, Grand Cayman (KY)

( * ) Notice: Subject to any disclaimer, the term of this patent is extended or adjusted under 35 U.S.C. 154(b) by 194 days.

(21) Appl. No.: 16/539,173

(22) Filed: Aug. 13, 2019

(65) Prior Publication Data

US 2019/0362314 A1 Nov. 28, 2019

Related U.S. Application Data

(63) Continuation of application No. PCT/CN2018/075015, filed on Feb. 2, 2018.

(30) Foreign Application Priority Data

Feb. 14, 2017 (CN) .......................... 201710079178.3

(51) Int. Cl.
| | | |
|---|---|---|
| *G06Q 10/00* | (2012.01) | |
| *G06Q 10/10* | (2012.01) | |
| *G06F 3/14* | (2006.01) | |
| *H04L 12/58* | (2006.01) | |
| *H04L 29/08* | (2006.01) | |

(52) U.S. Cl.
CPC .............. *G06Q 10/103* (2013.01); *G06F 3/14* (2013.01); *H04L 51/04* (2013.01); *H04L 67/26* (2013.01)

(58) Field of Classification Search
CPC ......... G06Q 10/103; G06F 3/14; H04L 51/04; H04L 67/26

USPC .................. 705/301; 709/206, 204, 217, 203
See application file for complete search history.

(56) References Cited

U.S. PATENT DOCUMENTS

| | | | |
|---|---|---|---|
| 6,789,252 B1 | 9/2004 | Burke et al. | |
| 8,788,590 B2 | 7/2014 | Culver et al. | |
| 9,311,499 B2 | 4/2016 | Redlich et al. | |
| 10,616,278 B1 * | 4/2020 | Johansson | ........... H04L 65/1069 |
| 2002/0188527 A1 | 12/2002 | Dillard et al. | |

(Continued)

FOREIGN PATENT DOCUMENTS

| | | |
|---|---|---|
| CN | 102150401 | 8/2011 |
| CN | 104202353 | 12/2014 |
| CN | 106202136 | 12/2016 |

OTHER PUBLICATIONS

Translation of CN 1st Office Action for corresponding CN Application No. 201710079178.3 dated Jul. 2, 2021, a counterpart foreign application for U.S. Appl. No. 16/539,173, 6 pages.

(Continued)

*Primary Examiner* — Kaylee J Huang
(74) *Attorney, Agent, or Firm* — Lee & Hayes, P.C.

(57) ABSTRACT

A method including obtaining preset environment data by a client terminal of a mobile group office platform; and performing, by the client terminal, collaborative processing on a preset office event according to the preset environment data. According to the technical solutions of the present disclosure, collaborative processing is actively performed on the preset office event based on changes to environment data, thereby improving the processing efficiency of office events.

20 Claims, 14 Drawing Sheets

(56) References Cited

U.S. PATENT DOCUMENTS

| | | | |
|---|---|---|---|
| 2006/0242632 A1* | 10/2006 | Orsolini | G06Q 10/10 |
| | | | 717/140 |
| 2007/0262863 A1 | 11/2007 | Aritsuka et al. | |
| 2012/0278388 A1 | 11/2012 | Kleinbart et al. | |
| 2013/0232194 A1* | 9/2013 | Knapp | H04L 67/22 |
| | | | 709/203 |
| 2013/0268999 A1 | 10/2013 | Kiang et al. | |
| 2014/0025540 A1 | 1/2014 | Hendrickson | |
| 2015/0156454 A1* | 6/2015 | Inagaki | H04N 21/00 |
| | | | 348/14.07 |
| 2015/0364134 A1 | 12/2015 | Erhart et al. | |
| 2016/0247123 A1* | 8/2016 | Holst | G06Q 10/1095 |
| 2017/0134905 A1* | 5/2017 | Venkatesan | H04W 4/021 |
| 2017/0308975 A1 | 10/2017 | Eidelman et al. | |
| 2017/0310826 A1 | 10/2017 | Gunasekar et al. | |
| 2018/0159857 A1* | 6/2018 | Souto | H04W 12/04 |
| 2018/0337966 A1 | 11/2018 | Pearl et al. | |
| 2019/0349411 A1 | 11/2019 | Luo et al. | |

OTHER PUBLICATIONS

Translation of CN 1st Search Report for corresponding CN Application No. 201710079178.3 dated Jun. 24, 2021, a counterpart foreign application for U.S. Appl. No. 16/539,173, 2 pages.

\* cited by examiner

COLLABORATIVE EVENT PROCESSING METHOD AND APPARATUS

CROSS REFERENCE TO RELATED PATENT APPLICATIONS

This application claims priority to and is a continuation of PCT Patent Application No. PCT/CN2018/075015, filed on 2 Feb. 2018 and entitled "EVENT PROCESSING METHOD AND APPARATUS," which claims priority to Chinese Patent Application No. 201710079178.3, filed on 14 Feb. 2017 and entitled "EVENT PROCESSING METHOD AND APPARATUS," which are incorporated herein by reference in their entirety.

TECHNICAL FIELD

The present disclosure relates to the technical field of terminals, and, more particularly, to event processing methods and apparatuses.

BACKGROUND

In related technologies, mobile enterprise office platforms are more and more widely used in the office work of enterprises, educational institutions, government agencies and other organizations. The platforms not only improve communication efficiency between users and reduce communication costs, but also effectively improve the event processing efficiency and office work efficiency of users.

When a user processes a office event through a mobile enterprise office platform, processing environments required for different office events often have a certain difference. In other words, with respect to the environment condition in which the user is located, there may be processing requirements for different office events.

However, in the related technologies, users are required to actively identify changes in a group office environment and accordingly select corresponding office events in a mobile enterprise office platform for processing, which leads to delays in the processing of office events, especially for users who are not sensitive to changes in the group office environment, thus affecting the processing efficiency of office events.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In view of this, the present disclosure provides an event processing method and apparatus, which may actively perform collaborative processing on a preset office event based on changes to environment data to improve the processing efficiency of office events. In this present disclosure, for example, the office event refers to a group office event.

To achieve the above objective, the present disclosure provides the technical solutions as follows:

According to an example embodiment of the present disclosure, an event processing method is provided, which comprises:

obtaining preset environment data by a client terminal of an instant messaging application; and performing, by the client terminal, collaborative processing on a preset office event according to the preset environment data.

According to an example embodiment of the present disclosure, an event processing apparatus is provided, which comprises:

an obtaining unit configured to enable a client terminal of an instant messaging application to obtain preset environment data; and a collaborating unit configured to enable the client terminal to perform collaborative processing on a preset office event according to the preset environment data.

As shown from the foregoing technical solutions, by detecting and identifying the surrounding environment where a user is located through a mobile group office platform, the techniques of the present disclosure actively determine a preset office event associated with the environment without the user actively monitoring changes in the group office environment, thereby not only simplifying the user's operation, but also enhancing the sensitivity to environment changes through continuous and automatic analysis of environment data. Moreover, since the collaborative processing for the preset office event is actively performed by the mobile group office platform, the user does not need to manually search for the associated preset office event, and further the user may be actively prompted to perform timely processing on the preset office event, which is conducive to improving the processing efficiency of office events.

BRIEF DESCRIPTION OF THE DRAWINGS

In order to illustrate the technical solutions in the example embodiments of the present disclosure more clearly, the following briefly describes the accompanying drawings which aid in describing the example embodiments. Apparently, the accompanying drawings in the following description merely show some of the example embodiments of the present disclosure, and persons of ordinary skill in the art may derive other drawings from these accompanying drawings without creative efforts.

DETAILED DESCRIPTION

Figure 1:
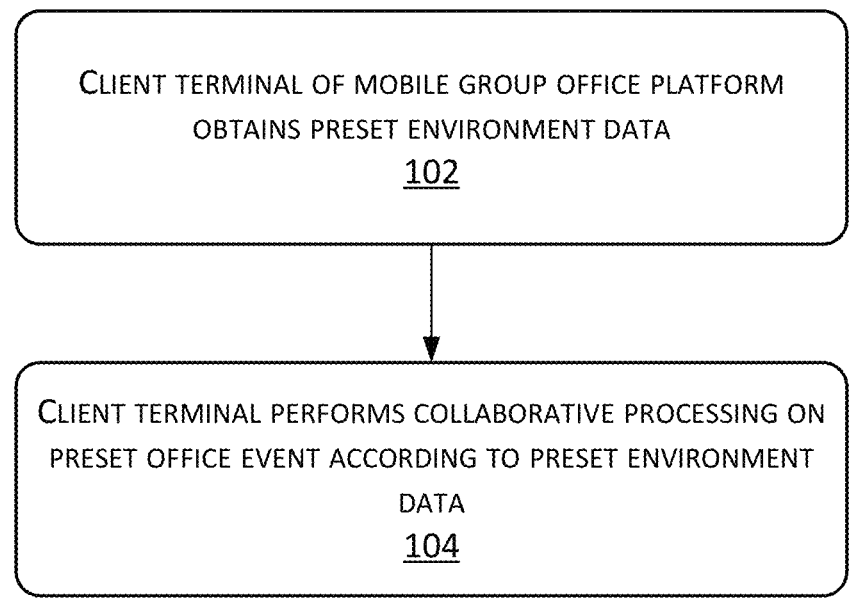
FIG. 1 is a flowchart of an event processing method according to an example embodiment of the present disclosure.

FIG. 1 is a flowchart of an event processing method according to an example embodiment of the present disclosure. As shown in FIG. 1, the method is applied to a client terminal of a mobile group office platform running on an electronic device, and may include the following steps:

Step 102: the client terminal of the mobile group office platform obtains preset environment data.

In this example embodiment, the mobile enterprise office platform not only may realize the communication function, but also may be used as an integrated function platform of many other functions, for example, for processing internal events of an enterprise, such as approval events (such as leave, office supply application, financial and other approval events), attendance events, task events and log events, and for another example, for processing external events of the enterprise, such as meal ordering and purchasing, which is not limited in the present disclosure.

For example, the mobile enterprise office platform may be hosted in instant messaging applications in related technologies, for example, enterprise instant messaging (EIM) applications such as Skype For Business®, Microsoft Teams®, Yammer®, Workplace®, Slack®, Enterprise WeChat®, Fxiaoke®, Enterprise Fetion®, and Enterprise Easychat®. Certainly, the instant messaging function is only one of the communication functions supported by the mobile enterprise office platform. The enterprise office platform can also implement more functions as mentioned above, which will not be elaborated here.

It should be noted that the application at a client terminal of the mobile enterprise office platform may be pre-installed on the electronic device so that the client terminal may be enabled and run on the electronic device; it is certain that, when using an on-line "client terminal" such as HTML5 technology, the client terminal may be obtained and run without installing a corresponding application on the electronic device.

In an example embodiment, the client terminal of the mobile group office platform may obtain the preset environment data by running the electronic device of the client terminal. For example, the preset environment data may include geographical location information, time point information, etc., and may be determined by a positioning module such as a GPS chip or a Beidou chip built in the electronic device; the preset environmental data may further include an external signal detected by the electronic device; for example, a WIFI signal, a Bluetooth signal and the like detected by the electronic device and coming from an external device may be determined by a WIFI module, a Bluetooth module, and the like built in the electronic device.

In another example embodiment, the client terminal of the mobile group office platform may receive a push message from a server terminal of the mobile group office platform, and the push message includes the preset environment data. For example, the preset environment data may include the state of a preset office event, such as completed, incomplete, completed proportion, unfinished proportion, etc. The push message may be sent by the server terminal to the client terminal after the client terminal initiates an inquiry to the server terminal, or the push message may be actively sent by the server terminal to the client terminal periodically.

Step 104, the client terminal performs collaborative processing on a preset office event according to the preset environment data.

In this example embodiment, any operation that can assist the user in processing the preset office event may be determined as the "collaborative processing" herein. In one case, the client terminal may generate a processing prompt for the preset office event to prevent the user from being not aware of an environment change promptly; for example, when a user response operation for the processing prompt is detected, a processing page for the preset office event may be displayed, or a preset processing operation may be performed for the preset office event. In another case, the client terminal may display a processing page for the preset office event, and the user's manual opening action on the processing page will be omitted, so that the client terminal performs a preset processing operation on the preset office event according to a trigger operation of the user to the processing page.

It should be noted that the "collaborative processing" refers to assisting users in processing office events and is different from "automatic processing" of office events by client terminals. Because in a group office scenario, more complex personnel and equipment relationships and efficient management within the group are involved, "automatic processing" may cause some erroneous processing; however, "collaborative processing" still reserves the initiative to process office events for users while assisting in simplifying users' operations, thus avoiding the problem of reduction in the processing efficiency of office events due to misoperations caused if the client terminal does not consider influence factors sufficiently.

In this example embodiment, the preset environment data may include event trigger data and event state data of a office event associated with the event trigger data; then, the client terminal may determine a specific office event associated with the event trigger data when obtaining the event trigger data, and when the event state data of the specific office event meets a predefined state, the client terminal may determine the specific office event as the above-mentioned preset office event and perform collaborative processing on the preset office event; in other words, after detecting the event trigger data and when it is required to further determine that the event state data meets the predefined state, the client terminal then performs collaborative processing on the corresponding preset office event.

For example, when detected environment data obtained by the client terminal meets a predefined trigger condition of any office event, the client terminal may take the detected environment data as the above-mentioned event trigger data, and the event trigger event is associated with the any office event. The predefined trigger condition may include at least one of the following: an external signal from an external device being detected and the external device belonging to a group to which logged-in users of the client terminal belong, being in a predefined trigger time period, and being in a predefined trigger geographical location range, etc.; and it is not limited by the present disclosure.

In this example embodiment, when performing collaborative processing on any office event, the client terminal may also record a corresponding user response frequency, i.e., the effective degree of the collaborative processing for the user, and the effective degree is positively correlated with the user response frequency. When the user response frequency for the any office event is not greater than a preset frequency threshold, it indicates that the collaborative processing for the any office event is less effective (i.e., the user basically does not need to perform collaborative processing); therefore, the client terminal may cancel the association relationship between the preset environment data and the any office event, so as to terminate the collaborative processing, based on the preset environment data, on the any office event, thereby preventing the collaborative processing from disturbing and influencing the user.

It could be seen from the foregoing technical solutions that, by detecting and identifying the surrounding environment where a user is located through a mobile group office platform, the present disclosure may actively determine a preset office event associated with the environment without the user actively monitoring changes in the group office environment, thereby not only simplifying the user's operation, but also enhancing the sensitivity to environment changes through continuous and automatic analysis of environment data. Moreover, since the collaborative processing for the preset office event is actively performed by the mobile group office platform, the user does not need to manually search for the associated preset office event, and further the user may be actively prompted to perform timely processing on the preset office event, which is conducive to improving the processing efficiency of office events.

Figure 2:
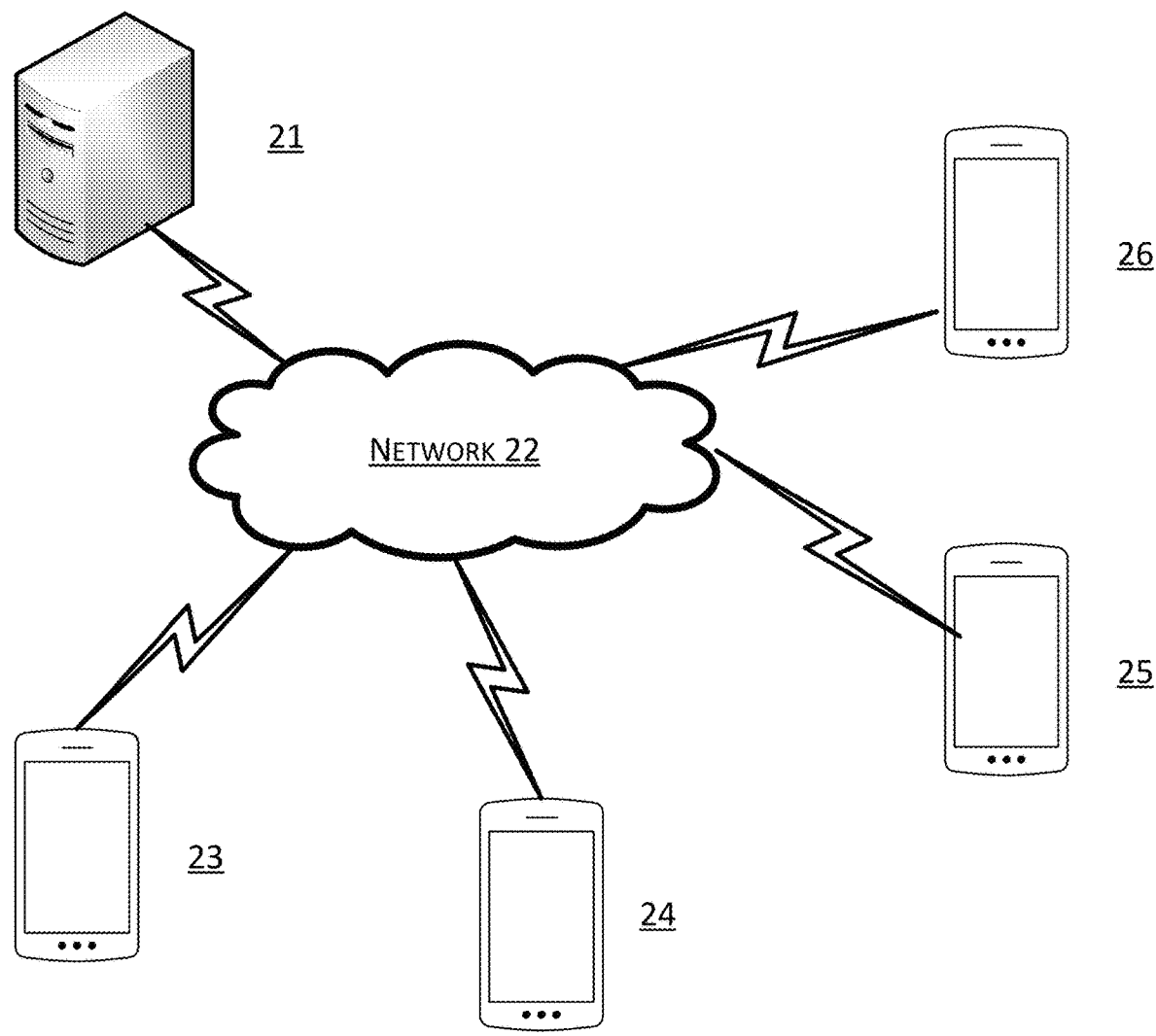
FIG. 2 is a schematic architecture diagram of an event processing system according to an example embodiment of the present disclosure.

FIG. 2 is a schematic architecture diagram of an event processing system according to an example embodiment of the present disclosure. As shown in FIG. 2, the system may include a server 21, a network 22, and a plurality of electronic devices, such as a mobile phone 23, a mobile phone 24, a mobile phone 25, and a mobile phone 26.

The server 21 may be a physical server including a separate host, or the server 21 may be a virtual server hosted by a host cluster, or the server 21 may be a cloud server. During the running process, the server 21 may run a server-side program of an application to implement related service functions of the application. For example, when running the program of a mobile group office platform, the server 21 may be implemented as a server terminal of the mobile group office platform. In the technical solution of the present disclosure, the server 21 can cooperate with client terminals running on the mobile phones 23-26 to implement an environment sensing-based collaborative processing solution.

The mobile phones 23-26 are just one type of electronic devices that may be used by users. In fact, users obviously may also use such electronic devices as tablet devices, notebook computers, PDAs (Personal Digital Assistants), wearable devices (such as smart glasses and smart watches), etc., which is not limited by the present disclosure. During the running process, the electronic devices may run a client-side program of an application to implement related service functions of the application, such as an environment data collection function and an environment sensing-based collaborative processing function.

The network 22 for interaction between the mobile phones 23-26 and the server 21 may include multiple types of wired or wireless networks. In an example embodiment, the network 22 may include a Public Switched Telephone Network (PSTN) and the Internet. Moreover, the electronic devices such as the mobile phones 23-26 may also communicate with each other through the network 22 by, for example, establishing a single-chat communication session between any two electronic devices; or, a plurality of electronic devices may participate in the same group chat communication session, so that any user may send a communication message to all other users in the group chat communication session through his/her own electronic device. For example, when the group chat communication session is an inter-group communication session among multiple groups, group members in these groups may conduct group chat communication through this inter-group communication session.

Certainly, by running the above-mentioned client-side program, the mobile phones 23-26 may implement the environment sensing-based collaborative processing function independently in some cases or may cooperate with the server 21 to implement the environment sensing-based collaborative processing function in some other cases, which is not limited by the present disclosure.

Figure 3:
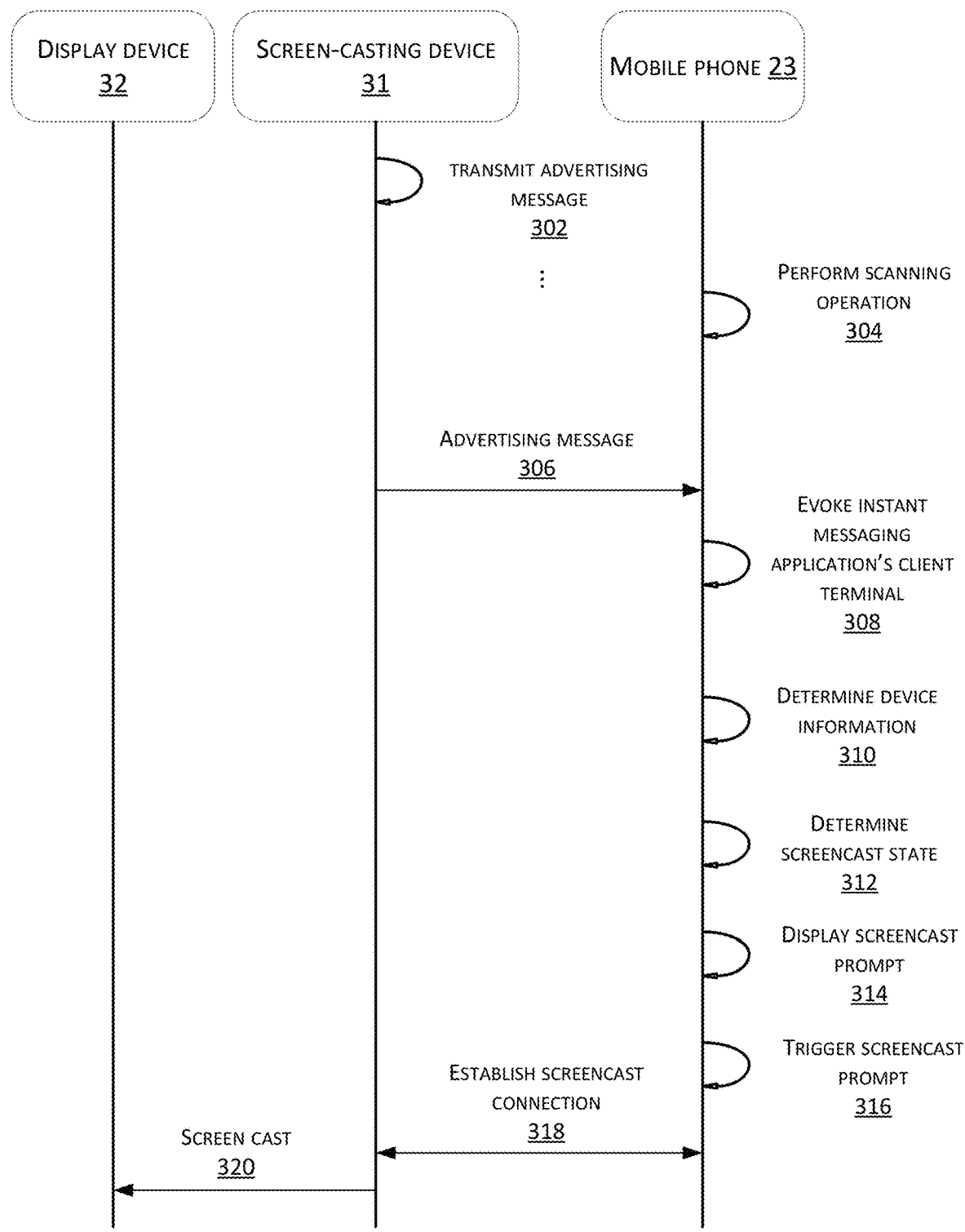
FIG. 3 is a flowchart of an environment sensing-based collaborative screencast event according to an example embodiment of the present disclosure.

For the sake of easy understanding, an enterprise instant messaging application is described as an example. It is assumed that the mobile phone 23 runs an instant messaging application's client terminal, and the server 21 runs an instant messaging application's server terminal; the instant messaging application's client terminal on the mobile phone 23 logs in a registered account of a user, that is, the mobile phone 23 is configured as the user's Instant messaging application's client terminal. The process of implementing the environment sensing-based collaborative processing solution by an enterprise member A in a certain enterprise via the mobile phone 23 is described below as an example to elaborate on the technical solution of the present disclosure:

FIG. 3 is a flowchart of an environment sensing-based collaborative screencast event according to an example embodiment of the present disclosure. As shown in FIG. 3, the connection to a screen-casting device 31 may be realized by the mobile phone 23 sensing the surrounding environment, so that the display content of the mobile phone 23 is synchronously displayed on a display device 32 by the screen-casting device 31, thereby realizing the screen-casting function. The above-mentioned cooperative screencast event may include the following steps:

Step 302, the screen-casting device 31 transmits an advertising message.

In this example embodiment, it is assumed that the screen-casting device 31 adopts the BLE technology based iBeacon protocol, and the screen-casting device 31 may repeatedly transmit an advertising message on a default transmission channel according to a default transmission period.

Figure 4:
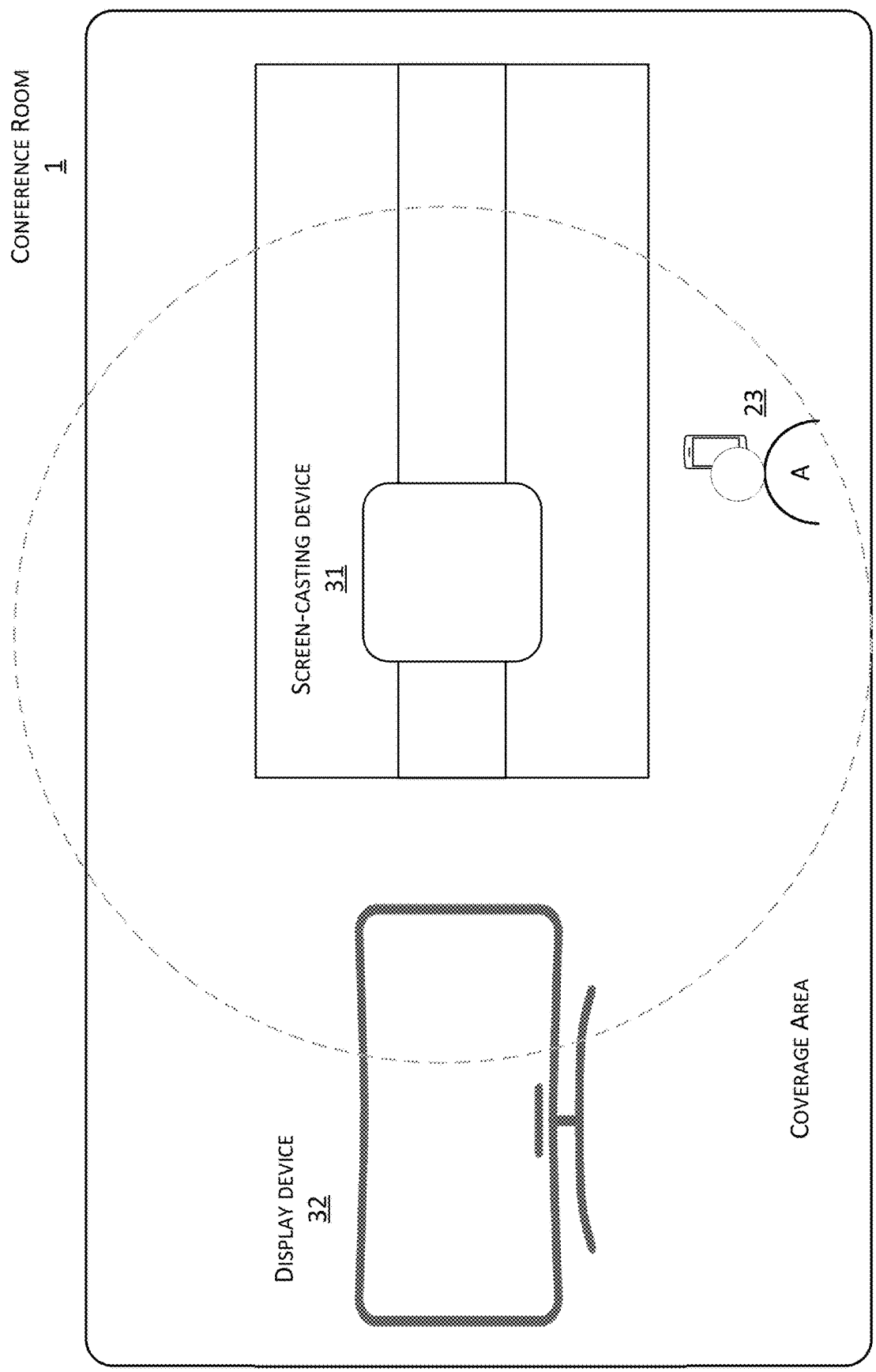
FIG. 4 is a schematic diagram of a scenario of a screencast event according to an example embodiment of the present disclosure.

In this example embodiment, similar to the mobile phone 23, the screen-casting device 31 may also run an instant messaging application's client terminal. For example, the screen-casting device 31 may be a hardware device such as a smart set-top box, and the smart set-top box runs an instant messaging application's client terminal to implement services and functions associated with the present disclosure. A registered account of the enterprise member A is logged-in in the instant messaging application's client terminal running on the mobile phone 23. Similarly, a registered account corresponding to the screen-casting device 31 is logged-in in the instant messaging application's client terminal running on the screen-casting device 31; for example, as shown in FIG. 4, it is assumed that the screen-casting device 31 and the display device 32 are both disposed in a conference room 1 of Enterprise AA, the registered account logged-in on the screen-casting device 31 may be "Enterprise AA-Conference Room 1."

Step 304, the mobile phone 23 performs a scanning operation.

Step 306, the mobile phone 23 receives an advertising message transmitted by the screen-casting device 31.

In this example embodiment, the mobile phone 23 may scan a preset channel according to a preset scanning period based on the BLE technology. As shown in FIG. 4, when the screen-casting device 31 transmits the advertising message, a coverage area with a preset distance as a radius around the screen-casting device 31 is formed; therefore, when the mobile phone 23 is located within the coverage area, the above-mentioned advertising message transmitted by the screen-casting device 31 will be received.

Step 308, an operating system of the mobile phone 23 evokes the instant messaging application's client terminal.

In this example embodiment, when the instant messaging application's client terminal has been running on the mobile phone 23, step 308 may be omitted and the process may directly proceed to step 310 and other subsequent processing steps. When the instant messaging application's client terminal is not running on the mobile phone 23, the mobile phone 23 may actively evoke the instant messaging application's client terminal by the following means: when the enterprise member A has a connection permission to the screen-casting device 31, the instant messaging application's client terminal may obtain a UUID (Universally Unique Identifier) of the screen-casting device 31 and the like in advance from the instant messaging application's server terminal, and register the UUID with the operating system of the mobile phone 23. Moreover, the UUID of the screen-casting device 31 is also included in the transmitted advertising message; consequently, when the mobile phone 23 receives the advertising message and parses the UUID included in the advertising message, if it is determined that the UUID is registered with the instant messaging application's client terminal, the mobile phone 23 may actively evoke the instant messaging application's client terminal, and the instant messaging application's client terminal then processes the advertising message.

Certainly, the mobile phone 23 may also not actively evoke the instant messaging application's client terminal; consequently, the enterprise member A may manually enable the instant messaging application's client terminal on the mobile phone 23, and the instant messaging application's client terminal then processes the advertising message received by the mobile phone 23.

Step 310, the instant messaging application's client terminal running on the mobile phone 23 determines device information of the screen-casting device 31.

In this example embodiment, the screen-casting device 31 is an "external device" with respect to the mobile phone 23, and the above-mentioned advertising message is an external signal sent by the screen-casting device 31. Then the mobile phone 23 may determine, according to information included in the advertising message, a group to which a sender device of the external signal belongs. For example, it is assumed that the advertising message includes the above-mentioned UUID, and the mobile phone 23 may locally store UUIDs of all devices under a group to which logged-in users belong, the group to which the sender device of the advertising message belongs may then be determined by comparing the UUID included in the advertising message; for example, when the mobile phone 23 locally has the UUID included in the advertising message, it indicates that the sender device (i.e., the screen-casting device 31) of the advertising message belongs to a group to which logged-in users of the instant messaging application's client terminal running on the mobile phone 23 belong (e.g., the Enterprise AA to which the enterprise member A belongs); and when the mobile phone 23 does not have the UUID included in the advertising message, it indicates that the sender device of the advertising message does not belong to the group to which the logged-in users of the instant messaging application's client terminal running on the mobile phone 23 belong. Alternatively, the mobile phone 23 may also send to the server 21 the UUID extracted from the advertising message, and an instant messaging application's server terminal running on the server 21 searches for the UUID (the instant messaging application's server terminal stores UUIDs of all devices under each group) to determine a group corresponding to the UUID.

Certainly, in addition to the UUID described above, the instant messaging application's client terminal running on the mobile phone 23 may also identify the sender device of the advertising message according to other information included in the advertising message (i.e., determining device information of the screen-casting device 31), which is not limited by the present disclosure.

When the instant messaging application's client terminal running on the mobile phone 23 logs in with the enterprise member A of the Enterprise AA and the instant messaging application's client terminal determines that the advertising message is from the screen-casting device 31 in the Enterprise AA, the instant messaging application's client terminal running on the mobile phone 23 may determine that the event trigger data is obtained (i.e., an external signal from an external device is detected, and the external device belongs to a group to which logged-in users of the client terminal belong), and further determine a specific office event associated with the event trigger data; for example, the specific office event may include a screencast event based on the screen-casting device 31.

In addition, when the instant messaging application's client terminal running on the mobile phone 23 determines, according to the obtained device information of the screen-casting device 31, that the screen-casting device 31 and the logged-in users of the instant messaging application's client terminal belong to different groups, the subsequent process may be terminated, that is, the cooperative processing associated with the screen-casting device 31 is not performed.

Step 312, the instant messaging application's client terminal running on the mobile phone 23 obtains a screencast state of the associated screencast event; and when the screencast state is "not screencast," the process proceeds to step 314.

Step 314, the instant messaging application's client terminal running on the mobile phone 23 displays a screencast prompt for the screen-casting device 31.

In this example embodiment, when the mobile phone 23 is not connected to the screen-casting device 31, that is, the screencast state of the screencast event for the screen-casting device 31 is "not screencast" (that is, the event state data of the specific office event meets a predefined state), the instant messaging application's client terminal running on the mobile phone 23 may implement corresponding collaborative processing, for example, displaying the screencast prompt for the screen-casting device 31.

In this example embodiment, the instant messaging application's client terminal running on the mobile phone 23 may implement the above-mentioned screencast prompt (i.e., a processing prompt for the "screencast event based on the screen-casting device 31") in many ways, to achieve the cooperative processing for the "screencast event based on the screen-casting device 31," which is not limited by the present disclosure. For example, a "Collaboration Prompt" window as shown in FIG. 5 may be displayed through the instant messaging application's client terminal running on the mobile phone 23, and such prompt content as "Screen-casting Device 'Enterprise AA-Conference Room 1' is found, enable the screen-casting function now?" is displayed in the window to remind the enterprise member A of using the screen-casting device 31 to implement the screen-casting function without the enterprise member A actively initiating a screen-casting operation based on the screen-casting device 31.

Step 316, after the mobile phone 23 detects that the user triggers the screencast prompt, the process proceeds to step 318.

Figure 5:
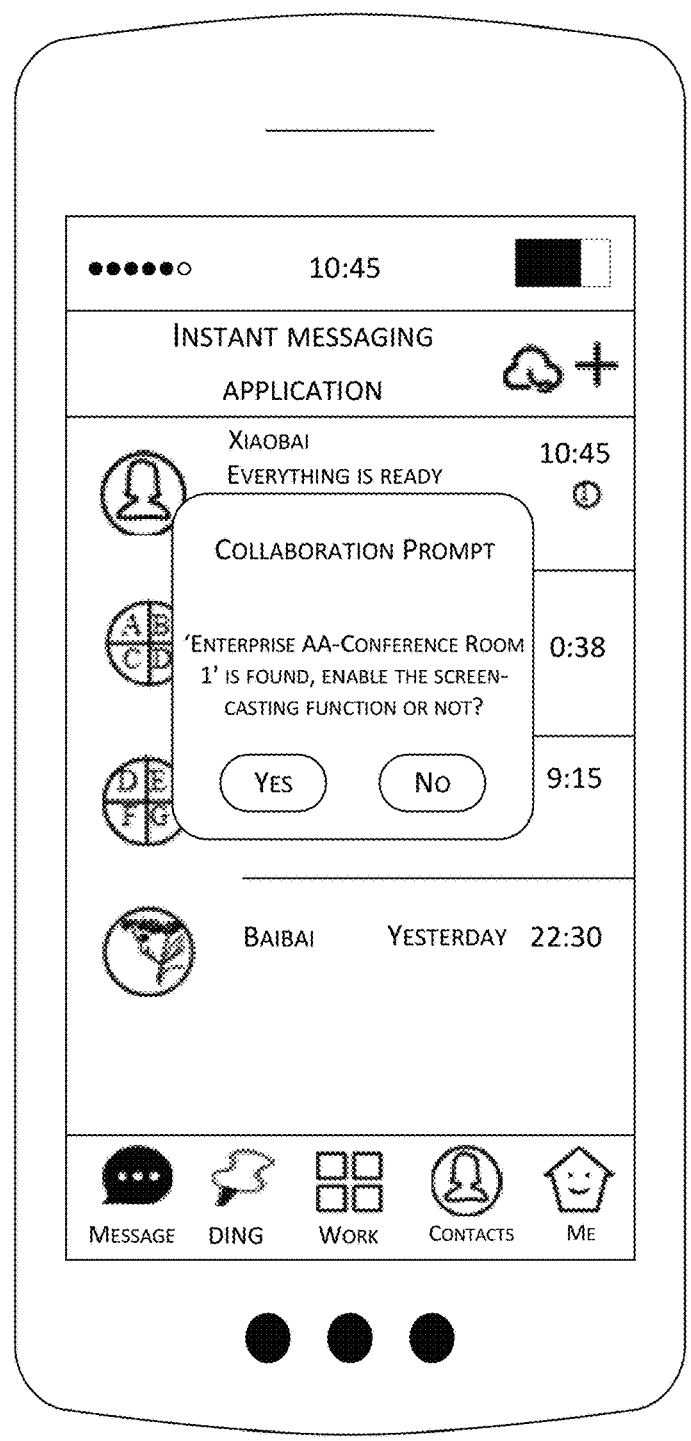
FIG. 5 is a schematic diagram of a screencast prompt interface according to an example embodiment of the present disclosure.

In this example embodiment, when the mobile phone 23 displays a screencast prompt in such a manner as shown in FIG. 5, if a user selection operation for an "Enable" option is detected, it may be determined that the user triggering the screencast prompt is detected; if a user selection operation for a "Cancel" option is detected, it may be determined that the user triggering the screencast prompt is not detected, and the process may be terminated.

In step 318, a screencast connection is established between the mobile phone 23 and the screen-casting device 31.

Figure 6:
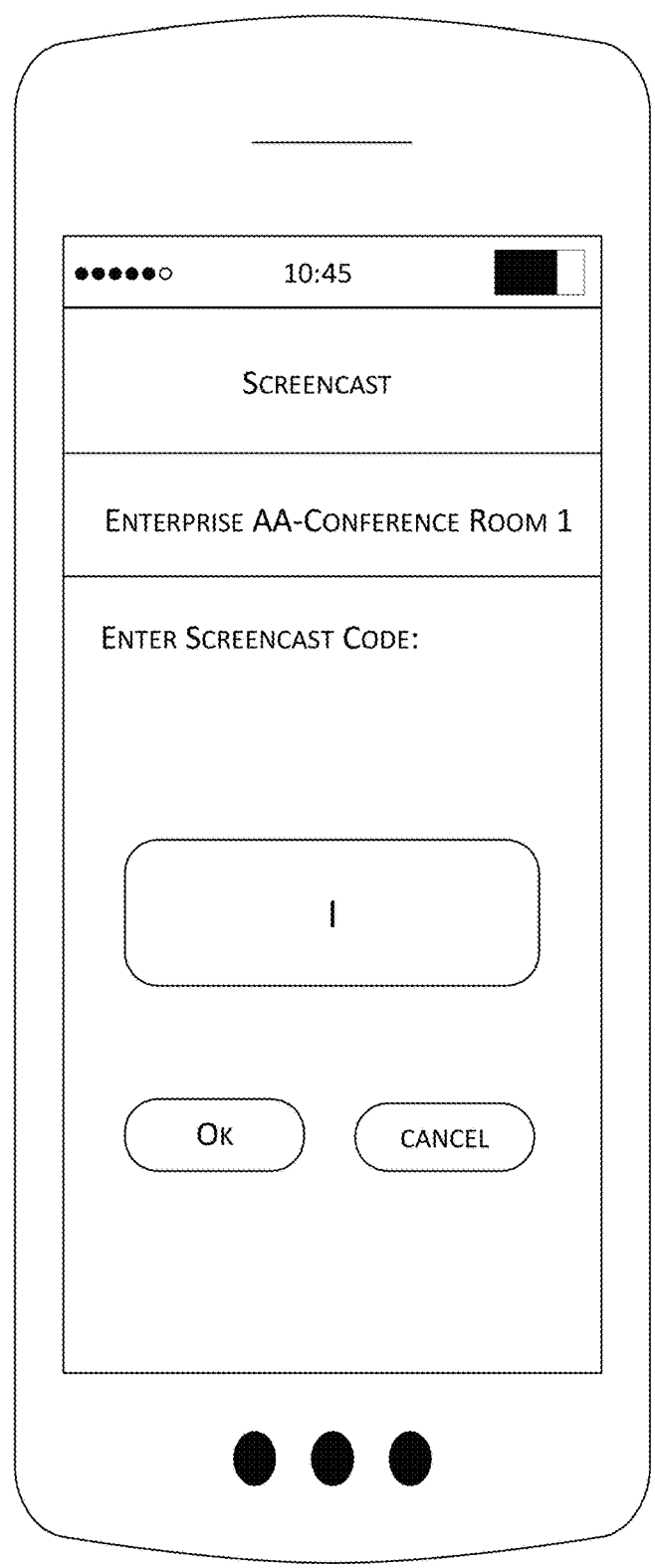
FIG. 6 is a schematic diagram of a screencast input interface according to an example embodiment of the present disclosure.

In this example embodiment, when the mobile phone 23 detects that the user triggers the screencast prompt, a connection between the mobile phone 23 and the screen-casting device 31 may be established directly, so that the screen-casting function for the mobile phone 23 is realized by the screen-casting device 31. Alternatively, when the mobile phone 23 detects that the user triggers the screencast prompt, the mobile phone 23 may display a screencast code input interface (i.e., a processing page for the "screencast event based on the screen-casting device 31") shown in FIG. 6 through the running Instant messaging application's client terminal, so that the enterprise member A determines to establish a connection between the mobile phone 23 and the screen-casting device 31 by inputting a predefined screencast code, and the screencast code here may be displayed on, for example, the display device 32.

It should be noted that in addition to the above-mentioned screencast prompt, the cooperative processing for the "screencast event based on the screen-casting device 31" may be implemented in other ways. For example, in the step 310, when the instant messaging application's client terminal running on the mobile phone 23 determines that the event trigger data is obtained and further determines that the specific office event associated with the event trigger data is a screencast event based on the screen-casting device 31, the instant messaging application's client terminal running on the mobile phone 23 may skip over the screencast prompt shown in FIG. 5 and directly display, for example, the screencast code input interface shown in FIG. 6; therefore, the efficiency of connection between the mobile phone 23 and the screen-casting device 31 may be improved and the user's operation may also be simplified greatly.

Step 320, the screen-casting device 31 screen casts the display content of the mobile phone 23 to the display device 32.

In this example embodiment, the screen-casting device 31 screen casts the display content of the mobile phone 23 to the display device 32, that is, the display device 32 displays the display content of the mobile phone 23 synchronously, so that the enterprise member A shares the display content of the mobile phone 23 with other users.

Figure 7:
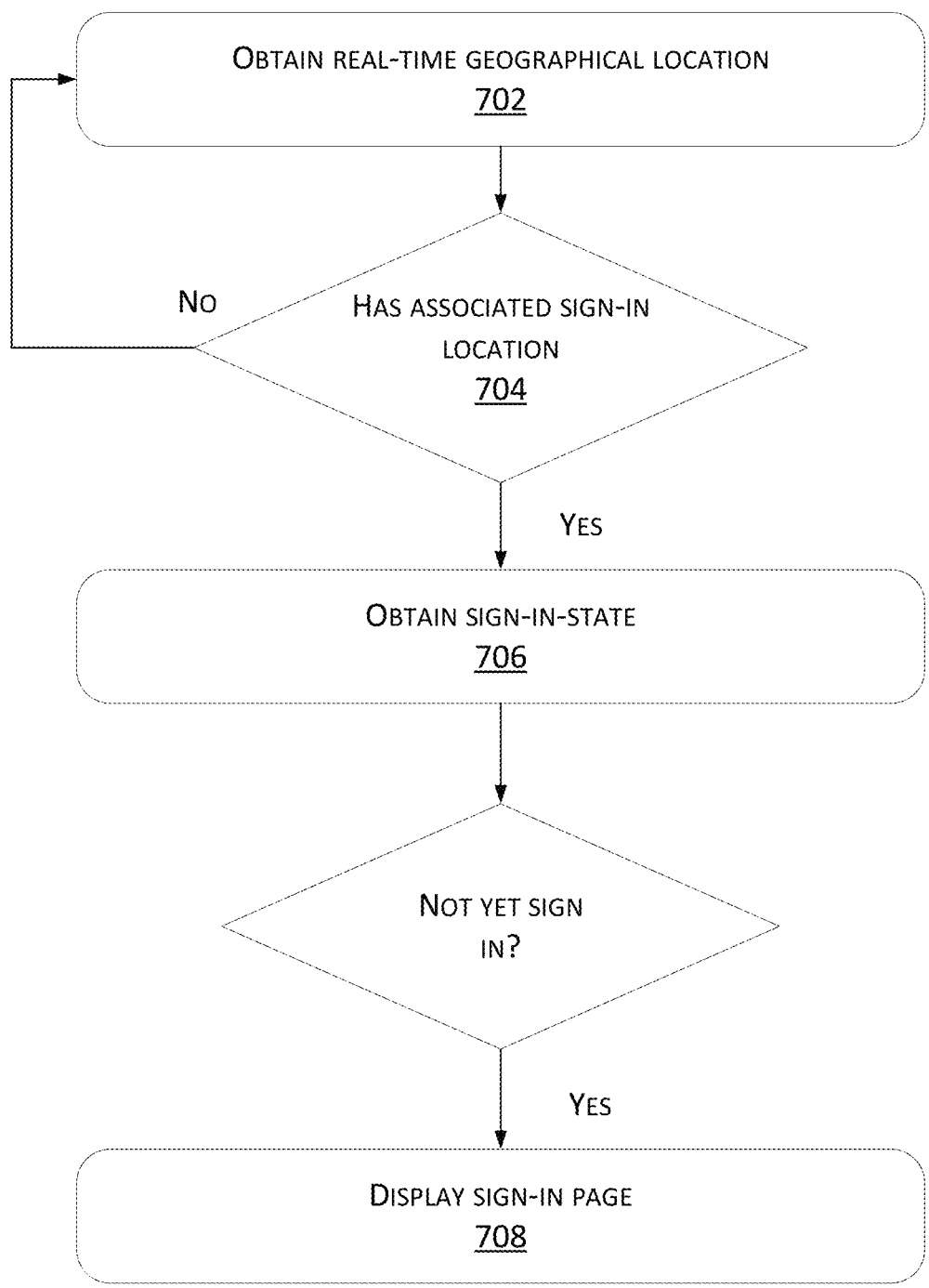
FIG. 7 is a flowchart of an environment sensing-based collaborative sign-in event according to an example embodiment of the present disclosure.

FIG. 7 is a flowchart of an environment sensing-based collaborative sign-in event according to an example embodiment of the present disclosure. As shown in FIG. 7, a sign-in function may be realized in a cooperative way by the mobile phone 23 sensing the surrounding environment. The above-mentioned cooperative sign-in event may include the following steps:

Step 702, the instant messaging application's client terminal running on the mobile phone 23 obtains a real-time geographical location.

Step 704, when determining that event trigger data is obtained, the instant messaging application's client terminal running on the mobile phone 23 determines whether the real-time geographical location has an associated sign-in location; when there is an associated sign-in location, the process proceeds to step 706. When there is no associated sign-in location, the process may return to step 702 as shown in FIG. 7 or just stop or terminate.

In this example embodiment, when the instant messaging application's client terminal runs on the mobile phone 23, corresponding real-time geographical location and the like may be obtained by a positioning module configured on the mobile phone 23. The positioning module here may include a GPS module and a Beidou module, which is not limited by the present disclosure. Certainly, the instant messaging application's client terminal may also obtain the real-time geographical location by any other means, which is not limited by the present disclosure. For example, for the mobile phone 23, in addition to the above-mentioned built-in positioning modules, the real-time geographical location may also be obtained by other means, such as obtaining the real-time geographical location (generated by a base station by means such as triangulation) from the base station through a communication module. For another example, the instant messaging application's client terminal may also initiate a positioning request to the instant messaging application's server terminal so that the instant messaging application's server terminal informs the instant messaging application's client terminal of the corresponding real-time geographical location.

In this example embodiment, when the real-time location is in a predefined trigger geographical location range, it may be determined that the instant messaging application's client terminal obtains event trigger data. The trigger geographical location range here may correspond to any type of target object such as an office building, a square and a parking lot, which is not limited by the present disclosure. Correspondingly, the instant messaging application's client terminal further determines a specific office event associated with the event trigger data. It is assumed that when the real-time geographical location is in a predefined trigger geographical location range, the corresponding specific office event may be a sign-in event.

Step 706, the instant messaging application's client terminal running on the mobile phone 23 obtains a sign-in state of the associated sign-in event, and when the sign-in state is "not yet sign in," the process proceeds to step 708.

Step 708, the instant messaging application's client terminal running on the mobile phone 23 displays a sign-in page.

In this example embodiment, the instant messaging application's client terminal running on the mobile phone 23 may determine the event state data of the sign-in event: determining whether there is a sign-in location in a "not yet sign in" state at the trigger geographical location corresponding to the real-time geographical location. For example, when there is a sign-in location in the "not yet sign in" state, the sign-in location in the "not yet sign in" state is determined as a sign-in location associated with the above-mentioned real-time geographical location, and the process then proceeds to the step 706 to implement collaborative processing for the sign-in event.

Figure 8:
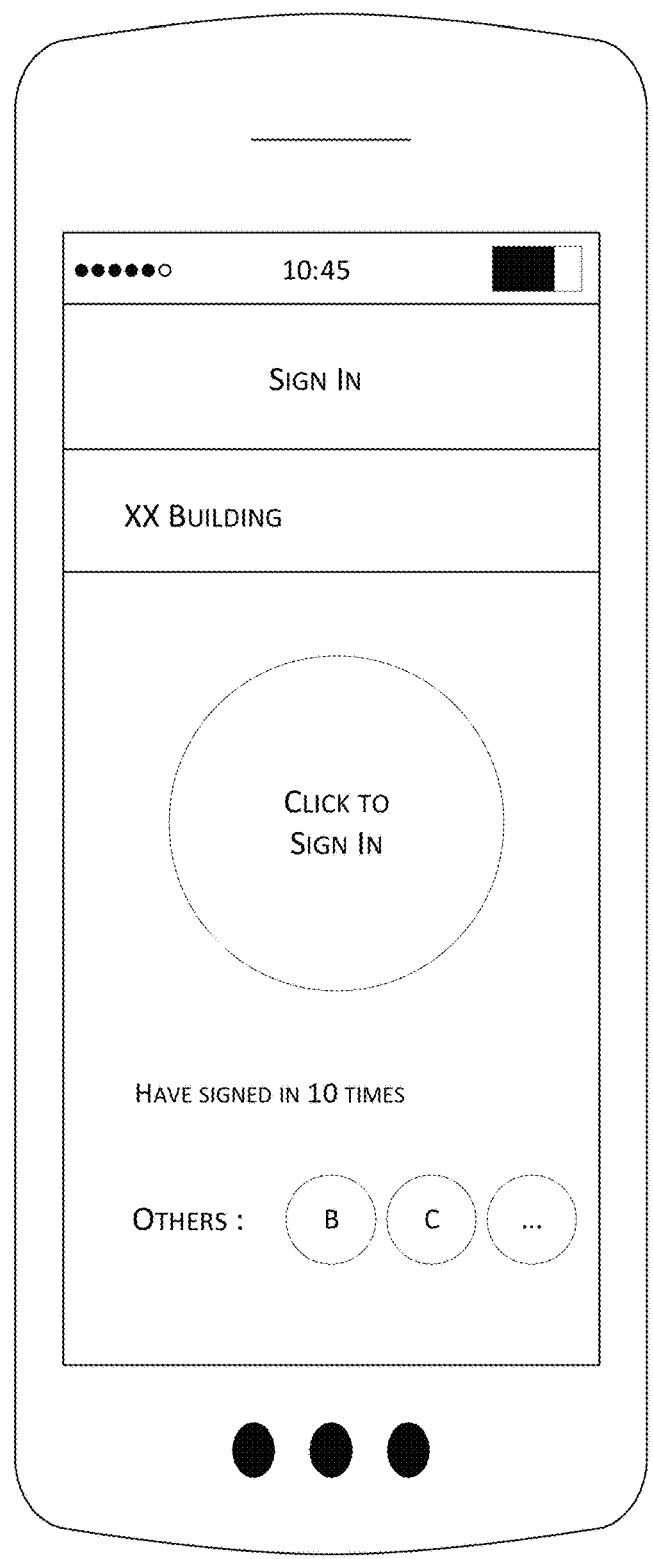
FIG. 8 is a schematic diagram of a sign-in page according to an example embodiment of the present disclosure.

In this example embodiment, it is assumed that the sign-in location associated with the above-mentioned real-time geographical location is "XX Building," the instant messaging application's client terminal may perform collaborative processing on the sign-in event at the "XX Building," for example, may display on the mobile phone 23 a sign-in page (i.e., a processing page for the sign-in event) as shown in FIG. 8, so that the enterprise member A only needs to trigger a "Click-to-sign-in" option in the sign-in page, without manually triggering the sign-in function. Therefore, the improvement in the processing efficiency of the sign-in event is facilitated, the user may be prompted to perform the sign-in operation timely to avoid the user's omission, and the user's operation may also be greatly simplified.

Figure 9:
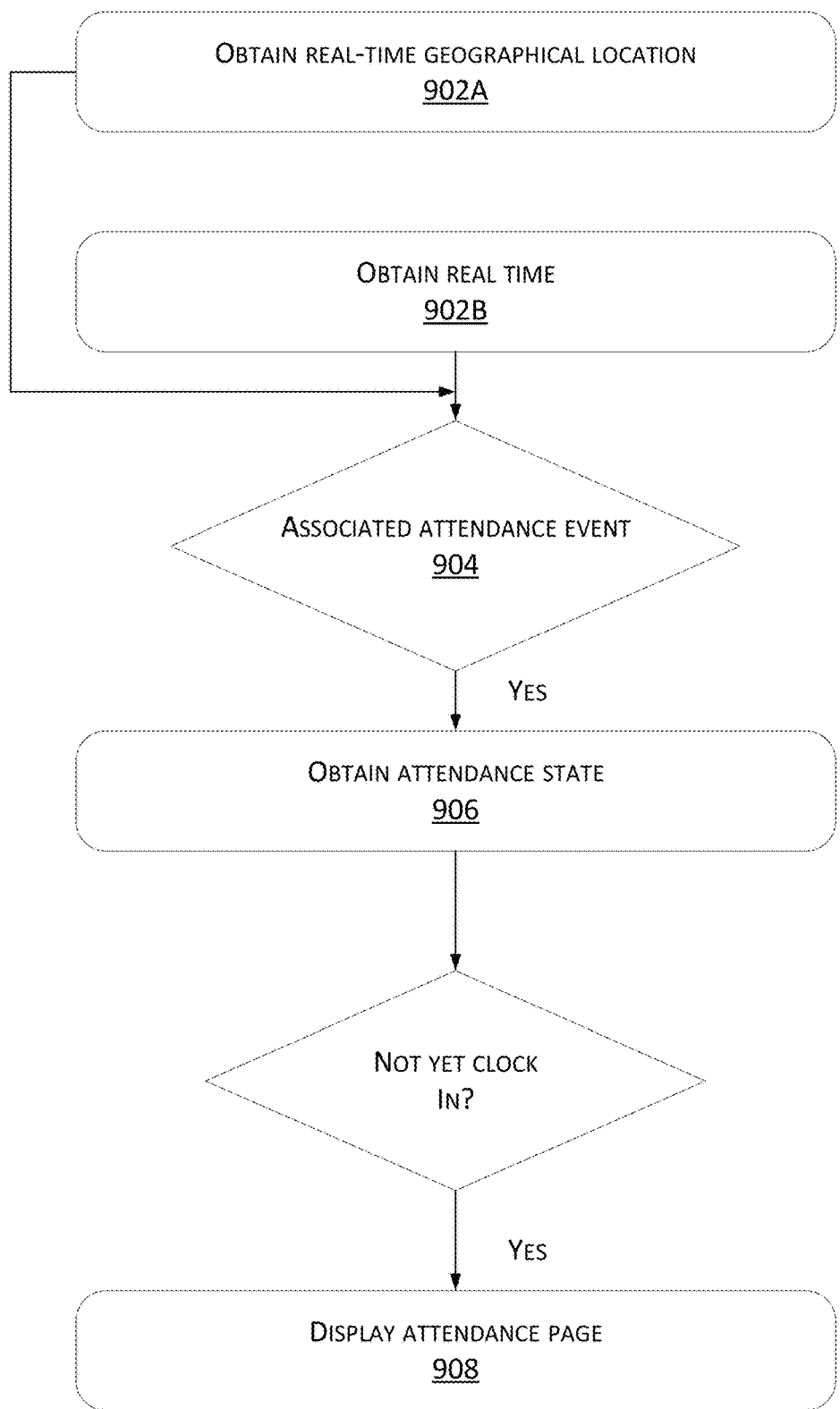
FIG. 9 is a flowchart of an environment sensing-based collaborative attendance event according to an example embodiment of the present disclosure.

FIG. 9 is a flowchart of an environment sensing-based collaborative attendance event according to an example embodiment of the present disclosure. As shown in FIG. 9, an attendance function may be realized in a cooperative way by the mobile phone 23 sensing the surrounding environment. The above-mentioned cooperative attendance event may include the following steps:

Step 902A, the instant messaging application's client terminal running on the mobile phone 23 obtains a real-time geographical location.

Step 902B, the instant messaging application's client terminal running on the mobile phone 23 obtains a real time.

In this example embodiment, for the real-time geographical location, reference may be made to the step 702 in the foregoing example embodiment shown in FIG. 7, and it will not be elaborated again herein. For the real time, the instant messaging application's client terminal may read the local time on the mobile phone 23 as the real time, or the instant messaging application's client terminal may also obtain a network time from the instant messaging application's server terminal as the real time.

Step 904, when determining that event trigger data is obtained, the instant messaging application's client terminal running on the mobile phone 23 determines whether there is an associated attendance event.

In this example embodiment, when it is determined that the real-time geographical location is in a predefined trigger geographical location range and the real time is in a predefined trigger time period, it may be determined that the instant messaging application's client terminal obtains event trigger data, and correspondingly the instant messaging application's client terminal further determines a specific office event associated with the event trigger data. It is assumed that the above-mentioned trigger geographical location range is the office location of the Enterprise AA and the trigger time period is an attendance time period of the Enterprise AA, and then the corresponding specific office event may include the attendance event.

Step 906, the instant messaging application's client terminal running on the mobile phone 23 obtains an attendance state of the associated attendance event, and when the attendance state is "not yet clock in," the process proceeds to step 908.

Step 908, the instant messaging application's client terminal running on the mobile phone 23 displays an attendance page.

Figure 10:
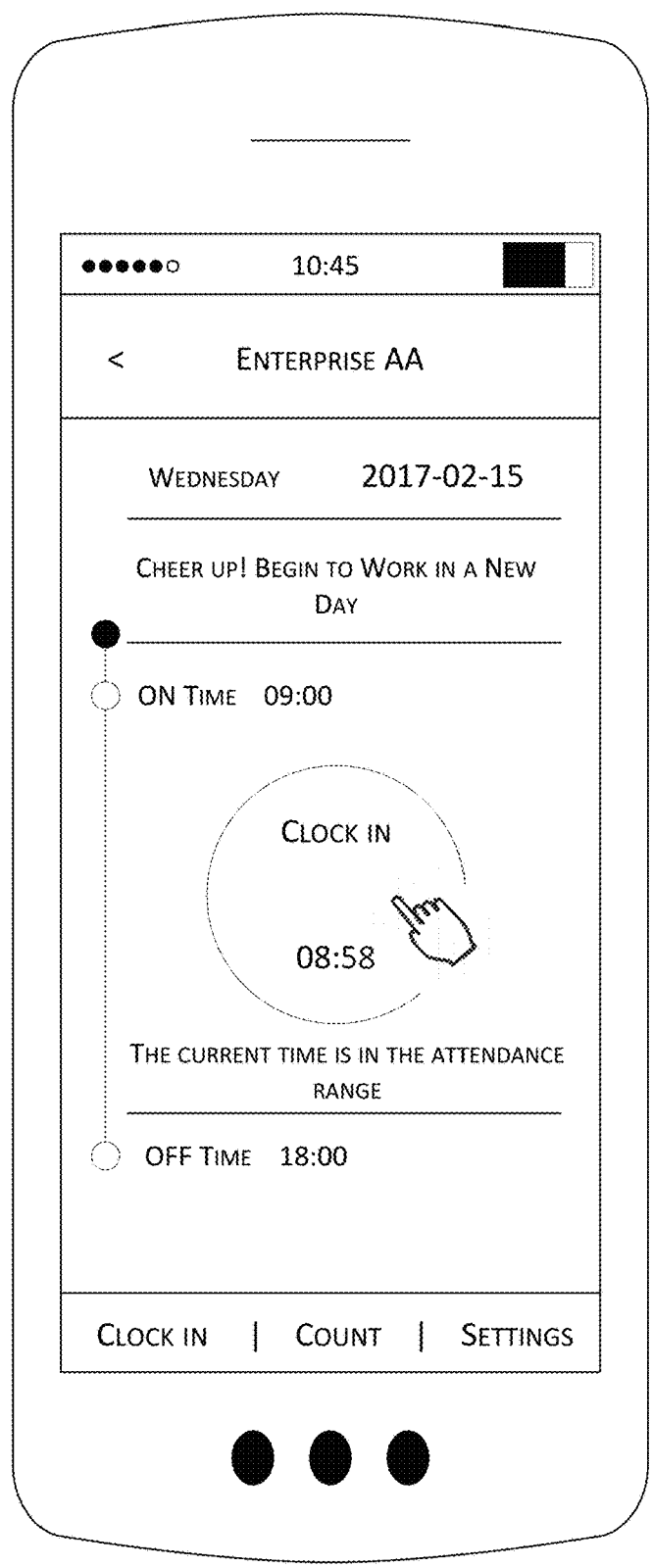
FIG. 10 is a schematic diagram of an attendance page according to an example embodiment of the present disclosure.

In this example embodiment, when the enterprise member A has not yet clocked in, that is, the attendance event is in the "not yet clock in" state (that is, the event state data of the specific office event meets a predefined state), the instant messaging application's client terminal may display an attendance page as shown in FIG. 10, so that the enterprise member A may complete the corresponding attendance by clicking a "Clock in" option in the attendance page, without manually triggering the attendance function to call out the attendance page. Therefore, the improvement in the processing efficiency of the attendance event is facilitated, the user may be prompted to perform the attendance operation timely to avoid the user's omission, and the user's operation may also be greatly simplified.

Figure 11:
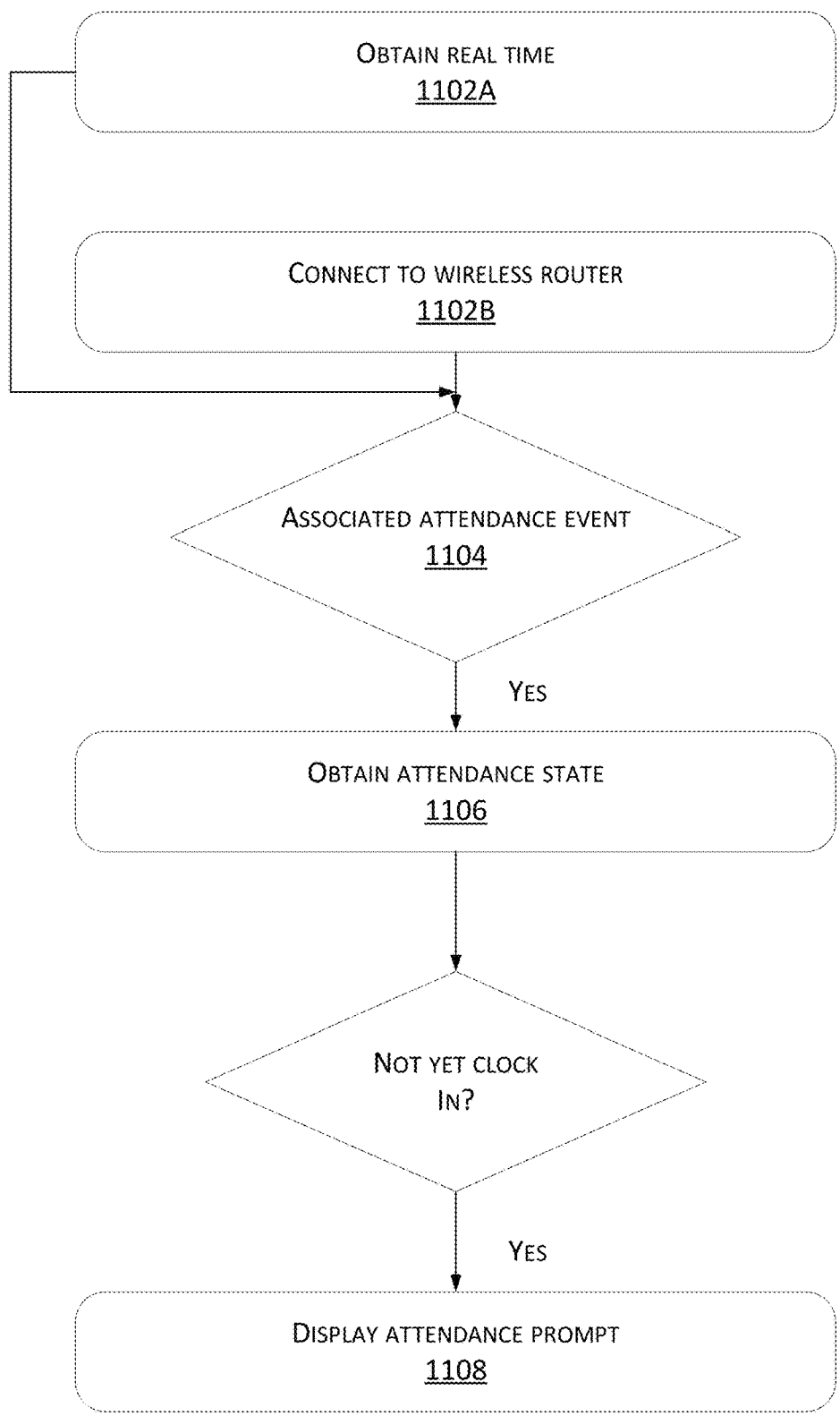
FIG. 11 is a flowchart of another environment sensing-based collaborative attendance event according to an example embodiment of the present disclosure.

FIG. 11 is a flowchart of another environment sensing-based collaborative attendance event according to an example embodiment of the present disclosure. As shown in FIG. 11, an attendance function may be realized in a cooperative way by the mobile phone 23 sensing the surrounding environment. The above-mentioned cooperative attendance event may include the following steps:

Step 1102A, the instant messaging application's client terminal running on the mobile phone 23 obtains a real time.

Step 1102B, the instant messaging application's client terminal running on the mobile phone 23 is connected to a wireless router.

Step 1104, when determining that event trigger data is obtained, the instant messaging application's client terminal running on the mobile phone 23 determines whether there is an associated attendance event.

In this example embodiment, when it is determined that the real time is in a predefined trigger time period and the wireless router connected to the mobile phone 23 is associated with Enterprise AA, it may be determined that the instant messaging application's client terminal obtains event trigger data, and correspondingly the instant messaging application's client terminal further determines a specific office event associated with the event trigger data. It is assumed that the above-mentioned trigger time period is an attendance time period of the Enterprise AA and the wireless router is installed in the Enterprise AA, and then the corresponding specific office event may include the attendance event.

Step 1106, the instant messaging application's client terminal running on the mobile phone 23 obtains an attendance state of the associated attendance event, and when the attendance state is "not yet clock in," the process proceeds to step 1108.

Step 1108, the instant messaging application's client terminal running on the mobile phone 23 displays an attendance prompt.

In this example embodiment, when the enterprise member A does not clock in, that is, the attendance event is in the "not yet clock in" state (i.e., the event state data of the specific office event meets a predefined state), the instant messaging application's client terminal running on the mobile phone 23 may display an attendance prompt for the attendance event; for example, the attendance prompt may include the "Collaboration Prompt" window shown in FIG.

Figure 12:
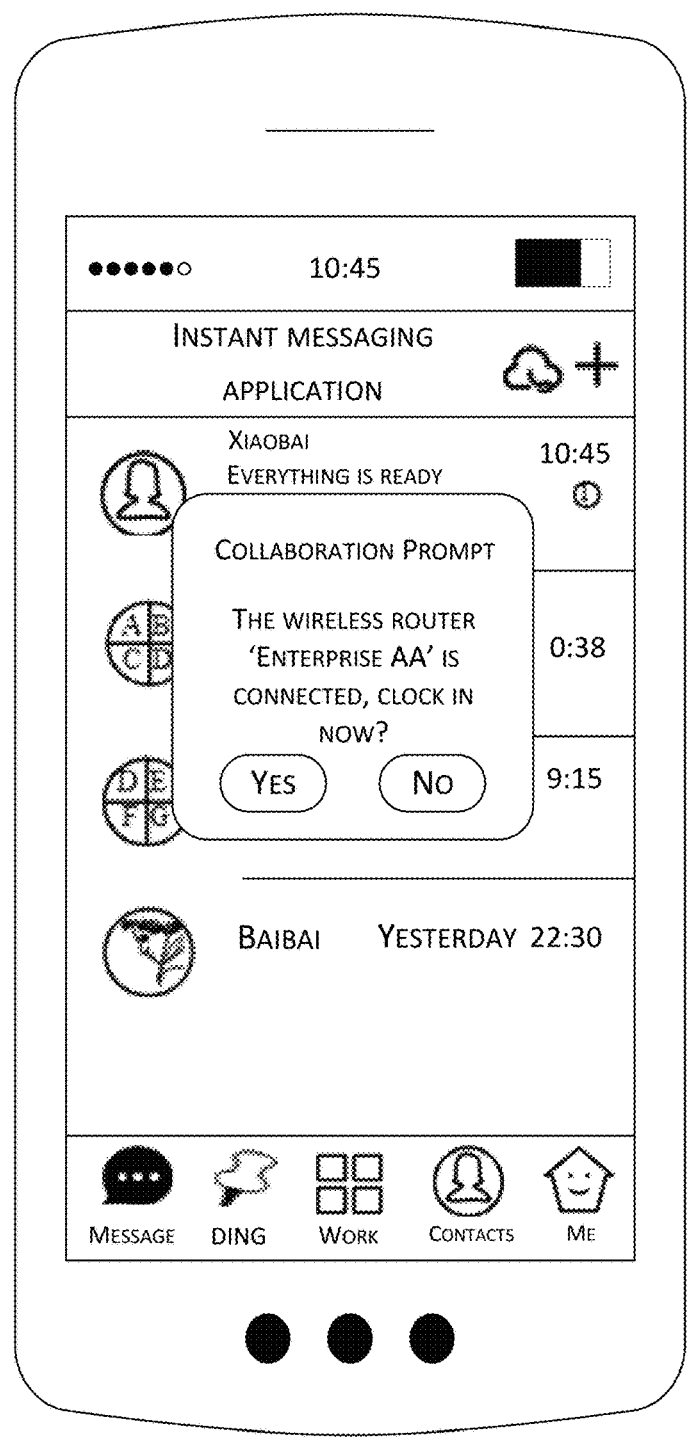
FIG. 12 is a schematic diagram of an attendance prompt interface according to an example embodiment of the present disclosure.

12; and such prompt content as "The wireless router 'Enterprise AA' is connected, clock in now?" is displayed in the window to remind the enterprise member A of implementing the subsequent attendance function (e.g., further evoking the attendance page shown in FIG. 10, etc.) by triggering the "Clock in" option. Certainly, the instant messaging application's client terminal running on the mobile phone 23 may also directly display, for example, the attendance page shown in FIG. 10, and the attendance prompt as shown in FIG. 12 may also be displayed in the step 908 in the example embodiment shown in FIG. 9, which will not be elaborated herein.

In the technical solutions of the present disclosure, the instant messaging application's client terminal is still used as an example. When the instant messaging application's client terminal performs collaborative processing on any office event, if a user does have a processing demand for the any office event, then the user may respond to the instant messaging application's client terminal and complete the processing for the any office event; alternatively, if the user does not have a processing demand for the any office event, the user also may not respond to the instant messaging application's client terminal, so as to ignore the processing for the any office event.

Therefore, when the instant messaging application's client terminal performs collaborative processing on each office event, the corresponding user response frequencies are separately recorded; correspondingly, when the user response frequency for any office event is not greater than a preset frequency threshold, it may be determined that the user does not have a processing demand for the any office event, and therefore the instant messaging application's client terminal may cancel an association relationship between the any office event and the previously defined preset environment data, thereby terminating the collaborative processing, based on the preset environment data, for any office event; and the collaborative processing mode may be optimized by continuously learning the user's behavior and operating habits, so as to avoid bad influences of corresponding collaborative processing (such as displaying a processing prompt or a processing page) on the user.

Figure 13:
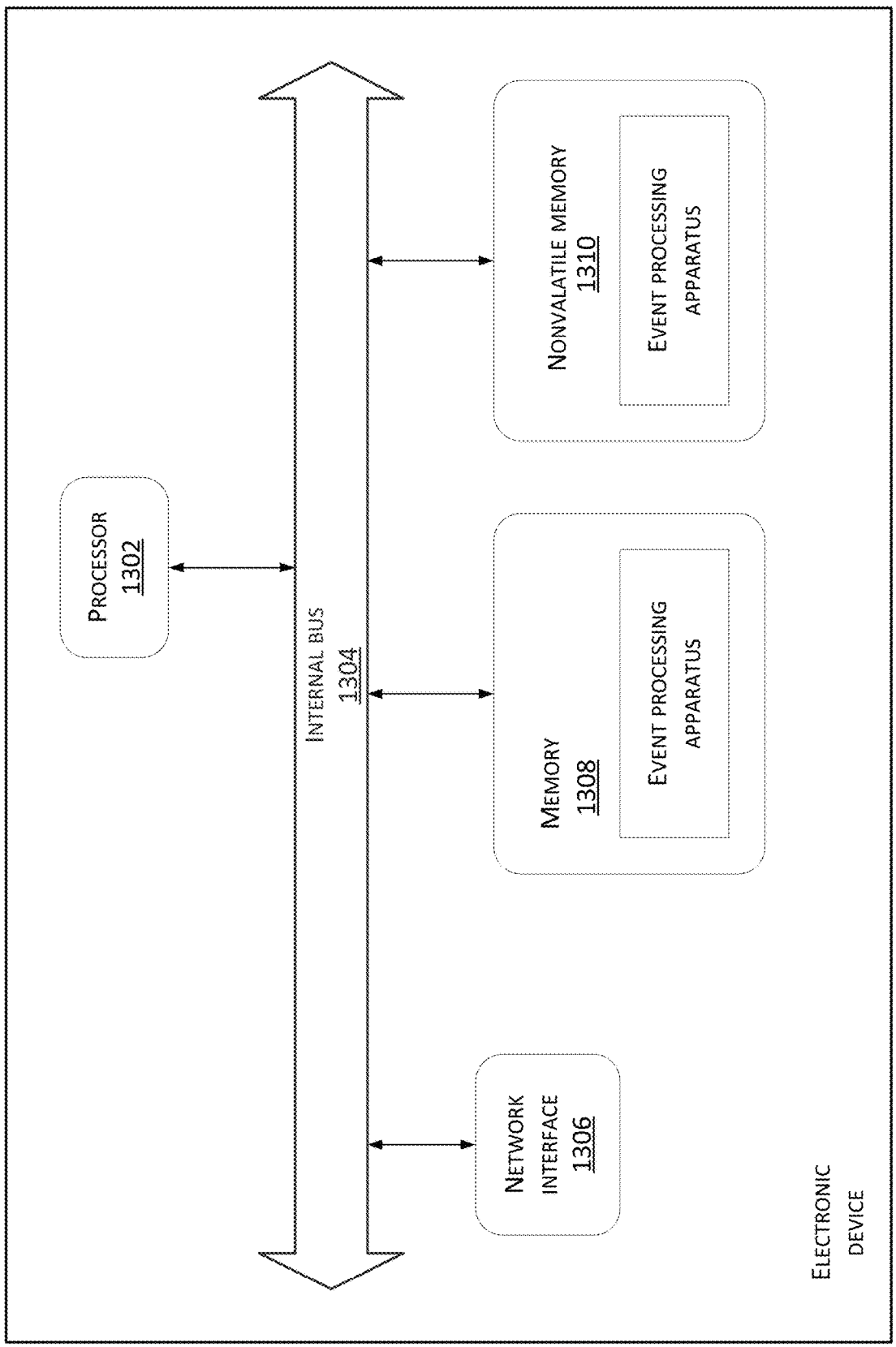
FIG. 13 is a schematic structural diagram of an electronic device according to an example embodiment of the present disclosure.

FIG. 13 shows a schematic structural diagram of an electronic device according to an example embodiment of the present disclosure. Referring to FIG. 13, at the hardware level, the electronic device includes a processor 1302, an internal bus 1304, a network interface 1306, a memory 1308, and a non-volatile memory 1310, and of course may also include hardware required for other services. The processor 1302 reads a corresponding computer program from the non-volatile memory 1310 into the memory 1302 and then operates to form an event processing device at a logical level. Certainly, in addition to software implementations, the present disclosure does not exclude other implementations, such as a logic device or an implementation combining software and hardware, etc.; in other words, the execution subject of the following processing flow is not limited to each logical unit, and it also may be a hardware or logic device.

Figure 14:
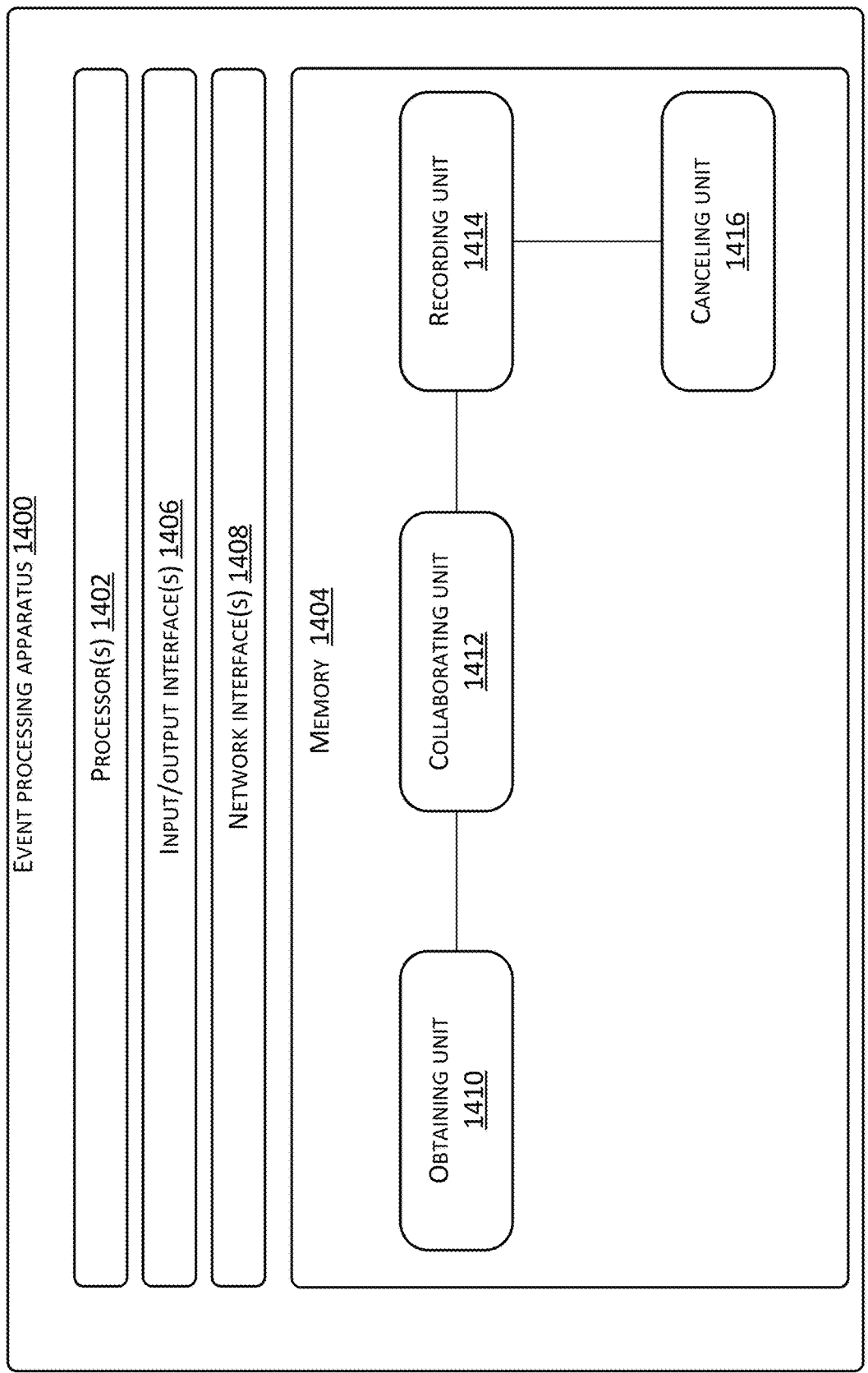
FIG. 14 is a block diagram of an event processing apparatus according to an example embodiment of the present disclosure.

Referring to FIG. 14, in some software implementations, an event processing apparatus 1400 includes one or more processor(s) 1402 or data processing circuit unit(s) and memory 1404. The event processing apparatus 1400 may further include one or more input/output interface(s) 1406 and one or more network interface(s) 1408. The memory 1404 is an example of computer readable medium or media.

The memory 1404 may store therein a plurality of modules or units including an obtaining unit 1410 and a collaborating unit 1412, wherein:

the obtaining unit 1410 is configured to enable a client terminal of an instant messaging application to obtain preset environment data; and the collaborating unit 1412 is configured to enable the client terminal to perform collaborative processing on a preset office event according to the preset environment data.

For example, the obtaining unit 1410 enables the client terminal to obtain preset environment data in at least one of the following ways:

enabling the client terminal to obtain the preset environment data by means of running an electronic device of the client terminal; and enabling the client terminal to receive a push message from a server terminal of the instant messaging application, the push message comprising the preset environment data.

For example, the collaborating unit 1412 is configured to enable the client terminal to generate a processing prompt for the preset office event; or enable the client terminal to display a processing page for the preset office event.

For example, the preset environment data includes event trigger data and event state data of a office event associated with the event trigger data; and the collaborating unit 1412 is configured to enable the client terminal to determine a specific office event associated with the event trigger data when the event trigger data is obtained; and when event state data of the specific office event meets a predefined state, enable the client terminal to take the specific office event as the preset office event and perform collaborative processing on the preset office event.

For example, the collaborating unit 1412 enables the client terminal to obtain the event trigger data in the following way:

when detected environment data obtained by the client terminal meets a predefined trigger condition of any office event, the client terminal takes the detected environment data as the event trigger data, and the event trigger event is associated with the any office event.

For example, the predefined trigger condition includes at least one of the following:

an external signal from an external device being detected and the external device belonging to a group to which logged-in users of the client terminal belong;

being in a predefined trigger time period; and being in a predefined trigger geographical location range.

For example, the event processing apparatus 1400 may further includes the following units stored in the memory 1404:

a recording unit 1414 configured to enable the client terminal to record a corresponding user response frequency when collaborative processing is performed on any office event; and a canceling unit 1416 configured to enable the client terminal to cancel an association relationship between the preset environment data and the any office event when the user response frequency for the any office event is not greater than a preset frequency threshold, so as to terminate the collaborative processing, based on the preset environment data, on the any office event.

The systems, apparatuses, modules or units illustrated in the above example embodiments may be implemented by a computer chip or an entity, or by a product having a certain function. A typical implementing device is a computer, and the computer may be in a specific form of a personal computer, a laptop computer, a cellular phone, a camera phone, a smart phone, a personal digital assistant, a media player, a navigation device, an email receiving and sending device, a game console, a tablet computer, a wearable device or a combination of any of these devices.

In a typical configuration, the computer includes one or more processors (CPUs), input/output interfaces, network interfaces, and a memory.

The memory may be in a form of a non-permanent memory, a random-access memory (RAM), and/or a non-volatile memory, such as a read-only memory (ROM) or a flash RAM, in computer readable media. The memory is an example of computer readable media.

Computer readable media include both permanent and non-permanent, removable and non-removable media and may store information by any method or technology. The information may be a computer readable instruction, a data structure, a module of a program or other data. Examples of computer storage media include, but are not limited to, a phase change memory (PRAM), a static random access memory (SRAM), a dynamic random access memory (DRAM), other types of random access memories (RAMs), a read only memory (ROM), an electrically erasable programmable read-only memory (EEPROM), a flash memory or other memory technologies, a compact disk read-only memory (CD-ROM), a digital versatile disc (DVD) or other optical storage devices, a tape cassette, a magnetic tape/magnetic disk storage or other magnetic storage devices or any other non-transmission medium, and may be used for storing information accessible by computing devices. As defined herein, the computer readable media do not include transitory media, such as modulated data signals and carriers.

It should be further noted that the term "include," "comprise" or any other variations thereof are intended to cover non-exclusive inclusions such that a process, method, article, or device that includes a series of elements not only includes those elements but also includes other elements that are not listed explicitly, or also include inherent elements of the process, method, article, or device. In the absence of more limitations, an element defined by the sentence "including a/an . . . " does not exclude that the process, method, article or device including the element further has other identical elements.

Example embodiments will be described in detail herein, examples of which are illustrated in figures. When the following description refers to figures, the same numerals in different figures refer to the same or similar elements, unless otherwise indicated. The implementations described in the following example embodiments do not represent all implementations consistent with the present disclosure. Instead, they are merely examples of devices and methods consistent with some aspects, as detailed in the appended claims, of the present disclosure.

The terminology used in the present disclosure is for the purpose of describing specific example embodiments, but not intended to limit the present disclosure. The singular forms "a," "said" and "the" as used in the present disclosure and the appended claims are also intended to include plural forms unless other meanings are explicitly indicated in the context. It also should be understood that the term "and/or" as used herein refers to encompassing any or all possible combinations of one or more associated listed items.

It should be understood that although the terms "first," "second," "third," etc. may be used in the present disclosure to describe various types of information, such information should not be limited to these terms. These terms are only used to distinguish the same type of information from each other. For example, first information may also be referred to as second information without departing from the scope of the present disclosure. Similarly, the second information may also be referred to as the first information. Depending on the context, for example, the word "if" as used herein may be interpreted as "at the time of" or "when" or "in response to a determination."

The above description is merely example embodiments of the present disclosure and is not intended to limit the present disclosure. Any modifications, equivalent substitutions, improvements and the like, made within the spirit and principle of the present disclosure shall be covered in the scope of the present disclosure.

The present disclosure may further be understood with clauses as follows.

Clause 1. An event processing method comprising:
obtaining, by a client terminal of an instant messaging application, preset environment data; and
performing, by the client terminal, collaborative processing on a preset office event according to the preset environment data.

Clause 2. The method according to clause 1, wherein the obtaining, by the client terminal of the instant messaging application, the preset environment data comprises at least one of the following:
obtaining, by the client terminal, the preset environment data by running an electronic device of the client terminal; and
receiving, by the client terminal, a push message from a server terminal of the instant messaging application, the push message comprising the preset environment data.

Clause 3. The method according to clause 1, wherein the performing, by the client terminal, collaborative processing on the preset office event according to the preset environment data comprises:
generating, by the client terminal, a processing prompt for the preset office event; or
displaying, by the client terminal, a processing page for the preset office event.

Clause 4. The method according to clause 1, wherein:
the preset environment data comprises event trigger data and event state data of a office event associated with the event trigger data; and
the performing, by the client terminal, collaborative processing on the preset office event according to the preset environment data comprises:
  determining, by the client terminal, a specific office event associated with the event trigger data when the event trigger data is obtained; and
  when event state data of the specific office event meets a predefined state, treating, by the client terminal, the specific office event as the preset office event, and performing, by the client terminal, collaborative processing on the preset office event.

Clause 5. The method according to clause 4, wherein the client terminal obtains the event trigger data in the following way:
when detected environment data obtained by the client terminal meets a predefined trigger condition of the office event, the client terminal treats the detected environment data as the event trigger data, and the event trigger event is associated with the office event.

Clause 6. The method according to clause 5, wherein the predefined trigger condition comprises at least one of the following:

an external signal from an external device is detected and the external device belongs to a group to which a logged-in user of the client terminal belongs;
a predefined trigger time period; and
a predefined trigger geographical location range.

Clause 7. The method according to clause 1, further comprising:
recording, by the client terminal, a corresponding user response frequency when performing collaborative processing on the office event; and
when the user response frequency for the office event is not greater than a preset frequency threshold, canceling, by the client terminal, an association relationship between the preset environment data and the office event to terminate the collaborative processing, based on the preset environment data, on the office event.

Clause 8. An event processing apparatus comprising:
an obtaining unit configured to enable a client terminal of an instant messaging application to obtain preset environment data; and
a collaborating unit configured to enable the client terminal to perform collaborative processing on a preset office event according to the preset environment data.

Clause 9. The apparatus according to clause 8, wherein the obtaining unit enables the client terminal to obtain the preset environment data in at least one of the following ways:
enabling the client terminal to obtain the preset environment data by running an electronic device of the client terminal; and
enabling the client terminal to receive a push message from a server terminal of the instant messaging application, the push message comprising the preset environment data.

Clause 10. The apparatus according to clause 8, wherein the collaborating unit is specifically configured to
enable the client terminal to generate a processing prompt for the preset office event; or
enable the client terminal to display a processing page for the preset office event.

Clause 11. The apparatus according to clause 8, wherein the preset environment data comprises event trigger data and event state data of a office event associated with the event trigger data; and the collaborating unit is specifically configured to
enable the client terminal to determine a specific office event associated with the event trigger data when the event trigger data is obtained; and
when event state data of the specific office event meets a predefined state, enable the client terminal to treat the specific office event as the preset office event and perform collaborative processing on the preset office event.

Clause 12. The apparatus according to clause 11, wherein the collaborating unit enables the client terminal to obtain the event trigger data in the following way:
when detected environment data obtained by the client terminal meets a predefined trigger condition of the office event, the client terminal treats the detected environment data as the event trigger data, and the event trigger event is associated with the office event.

Clause 13. The apparatus according to clause 12, wherein the predefined trigger condition comprises at least one of the following:
an external signal from an external device is detected and the external device belonging to a group to which a logged-in user of the client terminal belongs;
a predefined trigger time period; and
a predefined trigger geographical location range.

Clause 14. The apparatus according to clause 8, further comprising:
a recording unit configured to enable the client terminal to record a corresponding user response frequency when collaborative processing is performed on a office event; and
a canceling unit configured to enable the client terminal to cancel an association relationship between the preset environment data and the office event when the user response frequency for the office event is not greater than a preset frequency threshold to terminate the collaborative processing, based on the preset environment data, on the office event.

What is claimed is:

1. A method comprising:
obtaining, by a client terminal of an instant messaging application, preset environment data;
performing, by the client terminal, a collaborative processing on a preset office event according to the preset environment data;
recording, by the client terminal, a corresponding user response frequency in response to performing the collaborative processing on the preset office event;
determining that the user response frequency for the preset office event is not greater than a preset frequency threshold; and
canceling an association relationship between the preset environment data and the preset office event to terminate the collaborative processing, based on the preset environment data, on the preset office event, in response to determining that the user response frequency for the preset office event is not greater than the preset frequency threshold.

2. The method according to claim 1, wherein the obtaining, by the client terminal of the instant messaging application, the preset environment data comprises:
obtaining, by the client terminal, the preset environment data by running an electronic device of the client terminal.

3. The method according to claim 1, wherein the obtaining, by the client terminal of the instant messaging application, the preset environment data comprises:
receiving, by the client terminal, a push message from a server terminal of the instant messaging application, the push message comprising the preset environment data.

4. The method according to claim 1, wherein the performing, by the client terminal, the collaborative processing on the preset office event according to the preset environment data comprises:
generating, by the client terminal, a processing prompt for the preset office event.

5. The method according to claim 1, wherein the performing, by the client terminal, the collaborative processing on the preset office event according to the preset environment data comprises:
displaying, by the client terminal, a processing page for the preset office event.

6. The method according to claim 1, wherein the preset environment data comprises:
event trigger data; and
event state data of an office event associated with the event trigger data.

7. The method according to claim 6, wherein the performing, by the client terminal, the collaborative processing on the preset office event according to the preset environment data comprises:

obtaining, by the client terminal, the event trigger data;
determining the office event associated with the event trigger data;
determining that the event state data meets a predefined state;
treating the office event as the preset office event; and
performing the collaborative processing on the preset office event.

8. The method according to claim 7, wherein the obtaining, by the client terminal, the event trigger data comprises:
determining that environment data obtained by the client terminal meets a predefined trigger condition of the office event; and
treating the environment data as the event trigger data, the event trigger data being associated with the office event.

9. The method according to claim 8, wherein the predefined trigger condition comprises that an external signal from an external device is detected, the external device belonging to a group to which a logged-in user of the client terminal belongs.

10. The method according to claim 8, wherein the predefined trigger condition comprises a predefined trigger time period.

11. The method according to claim 8, wherein the predefined trigger condition comprises a predefined trigger geographical location range.

12. An apparatus comprising:
one or more processors; and
one or more memories stored thereon computer readable instructions that, executable by the one or more processors, cause the one or more processors to perform acts comprising:
  obtaining preset environment data;
  performing a collaborative processing on a preset office event according to the preset environment data;
  recording a corresponding user response frequency in response to performing the collaborative processing on the preset office event;
  determining that the user response frequency for the preset office event is not greater than a preset frequency threshold; and
  canceling an association relationship between the preset environment data and the preset office event to terminate the collaborative processing, based on the preset environment data, on the preset office event, in response to determining that the user response frequency for the preset office event is not greater than the preset frequency threshold.

13. The apparatus according to claim 12, wherein the obtaining the preset environment data comprises at least one of the following:
obtaining the preset environment data by running a client terminal of an instant messaging application; and
receiving a push message from a server terminal of the instant messaging application, the push message comprising the preset environment data.

14. The apparatus according to claim 12, wherein the performing the collaborative processing on the preset office event according to the preset environment data comprises:
generating a processing prompt for the preset office event; or
displaying a processing page for the preset office event.

15. The apparatus according to claim 12, wherein:
the preset environment data comprises event trigger data and event state data of an office event associated with the event trigger data; and
the performing the collaborative processing on the preset office event according to the preset environment data comprises:
  determining the office event associated with the event trigger data when the event trigger data is obtained; and
  in response to determining that event state data of the office event meets a predefined state, treating the office event as the preset office event, and performing the collaborative processing on the preset office event.

16. The apparatus according to claim 15, wherein the acts further comprise obtaining the event trigger data in the following way:
in response to determining that the obtained environment data meets a predefined trigger condition of the office event, treating the obtained environment data as the event trigger data, the event trigger data being associated with the office event.

17. The apparatus according to claim 16, wherein the predefined trigger condition comprises at least one of the following:
an external signal from an external device is detected and the external device belongs to a group to which a logged-in user of a client terminal belongs;
a predefined trigger time period; and
a predefined trigger geographical location range.

18. One or more memories stored thereon computer readable instructions that, executable by one or more processors, cause the one or more processors to perform acts comprising:
obtaining preset environment data;
performing a collaborative processing on a preset office event according to the preset environment data;
recording a corresponding user response frequency in response to performing the collaborative processing on the preset office event;
determining that the user response frequency for the preset office event is not greater than a preset frequency threshold; and
canceling an association relationship between the preset environment data and the preset office event to terminate the collaborative processing, based on the preset environment data, on the preset office event, in response to determining that the user response frequency for the preset office event is not greater than the preset frequency threshold.

19. The one or more memories according to claim 18, wherein the obtaining the preset environment data comprises at least one of the following:
obtaining the preset environment data by running an electronic device of a client terminal of an instant messaging application; and
receiving a push message from a server terminal of the instant messaging application, the push message comprising the preset environment data.

20. The one or more memories according to claim 18, wherein the preset environment data comprises:
event trigger data; and
event state data of an office event associated with the event trigger data.

* * * * *